Aug. 6, 1935.  H. KÜPPENBENDER  2,010,268
COMBINED PHOTOGRAPHIC CAMERA AND DISTANCE METER
Filed June 29, 1934   3 Sheets-Sheet 1
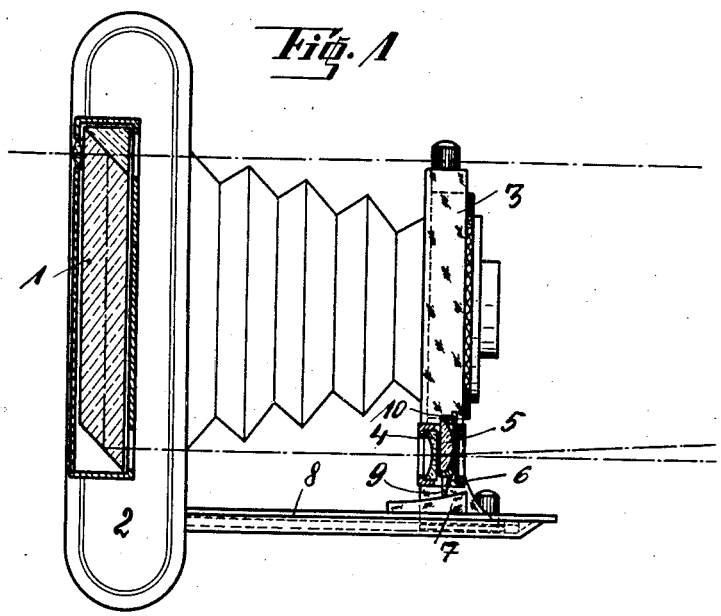
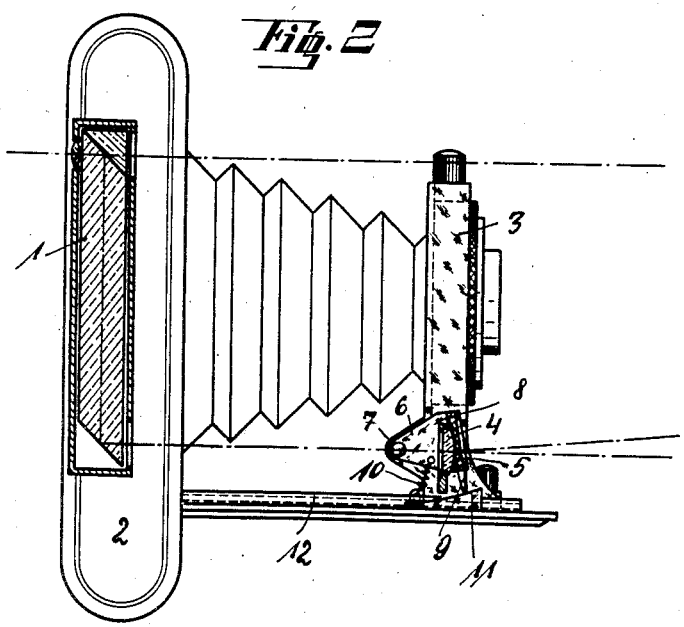
Inventor:
H. Küppenbender
by:
Hans Hederich
Attorney.

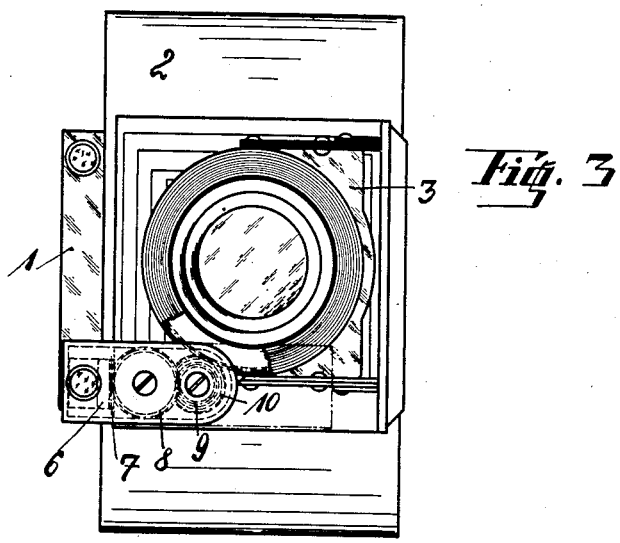
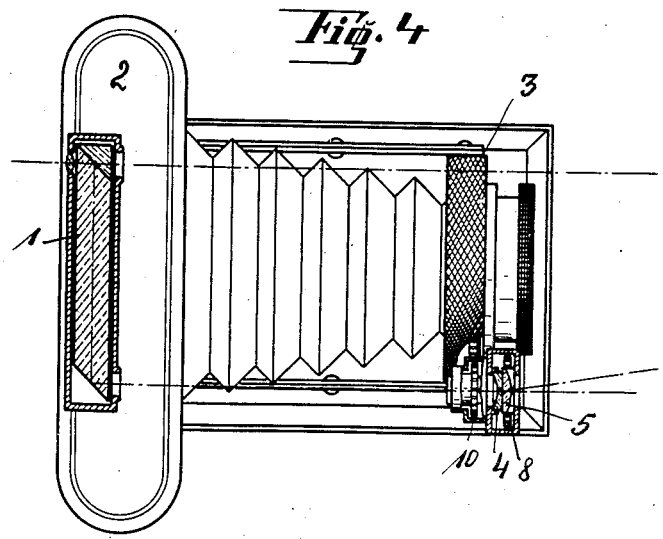

Aug. 6, 1935.   H. KÜPPENBENDER   2,010,268
COMBINED PHOTOGRAPHIC CAMERA AND DISTANCE METER
Filed June 29, 1934   3 Sheets-Sheet 3
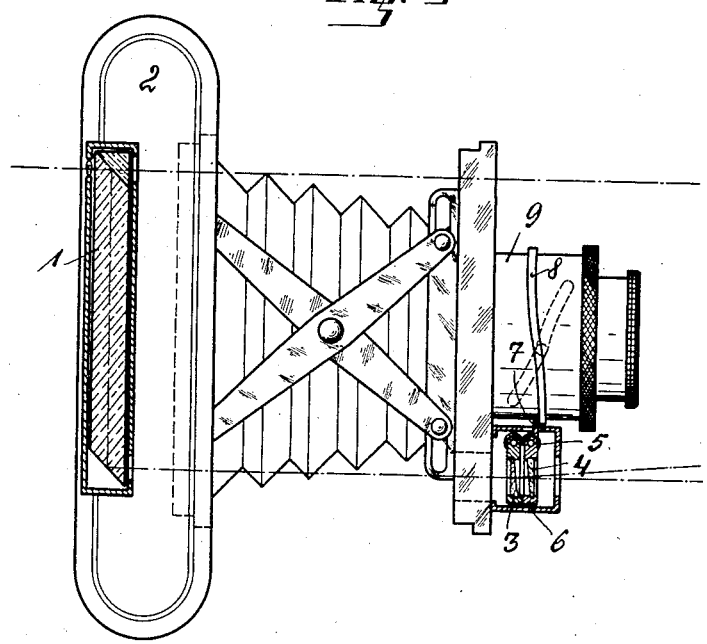
Inventor:
H. Küppenbender.
by:
Attorney.

Patented Aug. 6, 1935

2,010,268

UNITED STATES PATENT OFFICE 2,010,268

COMBINED PHOTOGRAPHIC CAMERA AND DISTANCE METER

Heinz Küppenbender, Dresden, Germany, assignor to Zeiss Ikon Aktiengesellschaft Dresden, Dresden, Germany Application June 29, 1934, Serial No. 732,981
In Germany October 25, 1933

5 Claims. (Cl. 95—44)

This invention relates to a device for use in connection with photographic cameras and intended for the sharp-adjustment of the exposing objective, this adjustment being effected by means of a distance meter, the readjustable optical part of which is mechanically connected with the objective adjusting means in such a manner as to deflect the measuring ray. I am aware of the fact that combinations of this kind are known and I do not claim them, therefore, as new. But there is this difference between the known devices of the kind stated and my invention that in said known devices the basis of the distance meter which meter consists of a mirror prism or any other reflecting member and the optical member for deflecting the measuring ray are built together so as to constitute an aggregate which is attached to the camera casing or to the baseboard or any other suitable part of the camera, whereas matters are otherwise in the camera improved according to this invention, as will instantly be explained. At any rate, in the said known devices, all parts pertaining to the distance meter constitute a unit, whereas in my improved arrangement and combination of parts the optical member constituting the basis of the distance meter is spatially separated from the other optical members which serve for deflecting the measuring ray.

This separation permits to utilize advantageously the available space in the camera; more precisely, it allows of equipping also small-size cameras with a distance meter. It is suited to the purpose in view to arrange the basis elements within the camera casing or attach them thereto at the outside whereas the optical means for deflecting the measuring ray are affixed to the support of the objective or to the mounting of the same. The movable part of the means for deflecting the measuring ray is connected with the means for the sharp-adjustment of the objective with respect to the object to be photographed. If the objective is shifted by means of a worm-thread, then the threaded member is coupled with the movable optical part of the distance meter by suitable mechanical intermediate members. The respective movable optical part of the distance meter can be actuated also by shifting the objective carrier if this shifting is used for the sharp-adjustment of the objective.

The invention is illustrated diagrammatically and by way of example on the accompanying drawings on which Figure 1 is a side-view of a photographic camera improved according to the present invention, a few members being shown in vertical axial section. Figure 2 is a similar representation showing a modification. Figure 3 is a front-view of another modification and Figure 4 is a plan of this modification. Finally, Figure 5 is a plan of still another modification, all as fully described hereinafter.

Referring to Fig. 1, I denotes the basis of the distance meter which is, in this case, located inside the camera casing 2. Attached to the objective carrier 3 are the optical members requisite for deviating the measuring ray, these members comprising a negative lens 4 and a positive lens 5 which latter is shiftable vertically with respect to the optical axis. The lens 5 is supported upon a sliding path 6 upon which it can be shifted in the just mentioned direction, this shifting being initiated by means of a member 7 having a curved or, more precisely, concave top surface and being affixed to the base-board 8 of the camera, that initial shifting taking place if the objective carrier 3 is shifted upon the base-board 8 relatively to the curved surface of said member 7. Upon this surface slides a pin 9 which is connected with the mounting 10 of the lens 5.

It is, however, as well possible to render the negative lens shiftable and making the positive lens stationary.

In Fig. 2 the basis I of the distance meter, or the prism I constituting that basis respectively, is likewise arranged within the camera casing 2. The positive lens 4 is firmly affixed to the objective carrier 3, and opposite said lens 4 is arranged the negative lens 5 which is turnable; this lens is secured to a lever-like member 6 supported upon an axle 7. The axis of this axle, or the fulcrum of the member 6 respectively, coincides with the centre of curvature of the lenses 4 and 5. At the mounting 8 of the negative lens 5 is a pin 9 which is drawn by means of a helical tensil spring 10 against the curved top surface of a member 11 affixed to the baseboard 12. If the objective carrier 3 is shifted in order to readjust the objective, the negative lens is moved in correspondence with the top surface of the member 11, and the measuring ray is correspondingly deflected.

Also in this case, as regards the constructional form illustrated in Fig. 2, it is possible to make the negative lens stationary and the positive lens shiftable, thus counter to the first-described form of the invention.

In the further modification shown in Figs. 3 and 4 the camera is equipped with an objective, the mounting of which can be turned for the purpose of sharp-adjustment of the objective.

The basis of the distance meter is again formed by a glass prism 1 that is attached to the camera 2. Firmly attached to the objective carrier 3 is the negative lens 4, whereas the positive lens 5 is shiftable. The mounting of the lens 5 is provided with a rack 7 meshing with a cog-wheel 8 which in turn meshes with a cog-wheel 9 driven by a cog-wheel 10 moving in turn the objective mounting. When the objective is moved for sharp-adjustment by turning the mounting the positive lens 5 is shifted correspondingly, whereby the measuring ray is deflected. It is, however, also with this modification possible to make the lens 5 stationary and the lens 4 movable.

In Fig. 5 the axial shifting of the objective for the purpose of sharp-adjustment of the same is likewise effected by turning the objective mounting. The basis of the distance meter which is again formed by a glass prism is again located within the camera casing, but may as well be arranged outside the same. Deflecting the measuring ray is effected by turnable wedges 3 and 4 which are substitutes for the lenses 3 and 4 of the other constructional forms of the invention. The wedge 3 is firmly affixed to the objective carrier, and the wedge 4 is turnable on an axle 5. At the mounting 6 of this wedge is a pin 7 sliding along a cam 8 provided on the shell of the mounting 9. A helical compressive spring surrounding the axle 5 presses the pin continuously against said cam. Also the wedge 3 may be movable, in which case both wedges are turned in order to deflect the measuring ray. The mountings of the wedges are in this case coupled with one another by small cog-wheels.

There is in all constructional forms described the common feature that the basis of the distance meter, irrespective of whether it is constituted by mirrors or by suitable glass prisms, is either attached to the camera casing or is arranged within the same, whereas the optical means serving to deflect the measuring ray are spatially separated from said basis, preferably in direct neighbourhood to the objective carrier or to the objective mounting, may be firmly connected therewith.

I claim:

1. A combined photographic camera and distance meter for the sharp-adjustment of the objective, characterized by the features that the distance meter is composed of a negative lens and a positive one, any of which lenses is turnable relatively to the other one, and that the centre of curvature of the said lenses coincides with the axis of turning of the movable lens and that, furthermore, the basis of said distance meter is attached to the camera casing, whereas the optical means likewise forming members of the distance meter and serving for deflecting the measuring ray are spatially separated from said basis.

2. A combined photographic camera and distance meter for the sharp-adjustment of the objective, characterized by the features that the distance meter consists of a negative lens and a positive lens, any of which lenses is movable relatively to the other lens, and that the basis of said distance meter is arranged at the camera, whereas the optical means likewise forming parts of the distance meter and serving for deflecting the measuring ray are spatially located away from said basis; a shiftable objective carrier, means for transmitting the movements of said carrier to the movable lens, and a curved guide path upon the base-board of the camera and adapted to initiate said transmission.

3. A combined photographic camera and distance meter suited for the sharp-adjustment of the objective, characterized by the features that the distance meter is composed of a negative lens and of a positive lens, any of which lenses is movable relatively to the other lens, and that the basis of said distance meter is arranged at the camera casing, whereas the optical means likewise forming parts of the distance meter and serving for deflecting the measuring ray are spatially separated from said basis, a turnable objective mounting and rigid means for transmitting the movements of said mounting to the movable lens.

4. A combined photographic camera and distance suited for the sharp-adjustment of the objective, characterized by the feature that the basis of said distance meter is attached to the camera casing whereas the optical means likewise forming parts of the distance meter and serving for deflecting the measuring ray are spatially separated from the objective, said optical means comprising two turnable wedges, a cam provided on the circumference of the rotatory objective mounting, and means transmitting the movements of said objective to said wedges.

5. A combined photographic camera and distance meter for the sharp-adjustment of the objective, comprising in combination with the camera casing and the objective carrier, a basis of the distance meter attached to said camera casing, and optical means for deflecting the measuring ray mounted on said objective carrier and composed of two parts adapted to be shifted relatively to each other to deflect the measuring ray.

HEINZ KÜPPENBENDER.